(12) United States Patent
Thies et al.

(10) Patent No.: US 8,747,003 B2
(45) Date of Patent: Jun. 10, 2014

(54) WRITING, DRAWING, DECORATING OR COSMETIC PENCIL

(75) Inventors: Andreas Thies, Effeltrich (DE); Nikolas Lins, Schweig Behringersdorf (DE); Christine Delapierre-Kohl, Herzogenaurach (DE); Johannes Herbolsheimer, Obernzenn (DE); Martin Jakob, Fürth (DE); Harald Lang, Sugenheim (DE); Simone Arthen, Nürnberg (DE)

(73) Assignee: J.S. Staedtler GmbH & Co. KG, Nürnberg (DE)

( * ) Notice: Subject to any disclaimer, the term of this patent is extended or adjusted under 35 U.S.C. 154(b) by 736 days.

(21) Appl. No.: 13/054,046

(22) PCT Filed: Jul. 11, 2009

(86) PCT No.: PCT/EP2009/005052
§ 371 (c)(1),
(2), (4) Date: Feb. 9, 2011

(87) PCT Pub. No.: WO2010/006744
PCT Pub. Date: Jan. 21, 2010

(65) Prior Publication Data
US 2011/0129284 A1    Jun. 2, 2011

(30) Foreign Application Priority Data

Jul. 15, 2008 (DE) .......................... 10 2008 034 015

(51) Int. Cl.
*B43K 19/00* (2006.01)
(52) U.S. Cl.
USPC ........... 401/49; 144/28; 428/511; 156/244.11

(58) Field of Classification Search
USPC ............... 401/49, 50, 52, 88; 264/129, 176.1, 264/211; 144/28, 28.1; 428/511, 512; 156/244.11, 244.12, 244.13
See application file for complete search history.

(56) References Cited

U.S. PATENT DOCUMENTS

| | | | | |
|---|---|---|---|---|
| 5,244,297 A * | 9/1993 | Bachelet et al. | ................. | 401/96 |
| 6,478,494 B1 * | 11/2002 | Eckl et al. | ......................... | 401/96 |
| 6,572,295 B1 * | 6/2003 | Chochoy et al. | ................ | 401/96 |

FOREIGN PATENT DOCUMENTS

| | | |
|---|---|---|
| DE | 102004021048 A | 11/2005 |
| DE | 102006046491 | 4/2008 |
| DE | 102006058485 Y | 6/2008 |
| WO | 01/43987 | 6/2001 |

* cited by examiner

*Primary Examiner* — David Walczak
(74) *Attorney, Agent, or Firm* — Lucas & Mercanti, LLP; Klaus P. Stoffel

(57) ABSTRACT

A pencil that includes a polymer-bonded lead, a polymer-bonded wood substitute material that includes an organic filler and covers or surrounds the lead along its length, and an adhesion promoter layer disposed between the lead and the wood substitute material. The lead and the wood substitute material each have a polymer. The polymer in the lead being incompatible with the polymer in the wood substitute material so that the polymer of the lead and the polymer of the wood substitute material do not create any connection with one another. The adhesion promoter layer is connected to the polymer in the lead and to the polymer in the wood substitute material so that the adhesion promoter layer forms a connection with the polymer in the lead and with the polymer of the substitute material. The organic filler is formed by particles having a maximum particle size of 250 μm.

12 Claims, 3 Drawing Sheets

WRITING, DRAWING, DECORATING OR COSMETIC PENCIL

The present application is a 371 of International application PCT/EP2009/005052 filed Jul. 11, 2009, which claims priority of DE 10 2008 034 015.4, filed Jul. 15, 2008, the priority of these applications is hereby claimed and these applications are incorporated herein by reference.

BACKGROUND OF THE INVENTION

The invention relates to a writing, drawing, decorating or cosmetic pencil comprising a colour-delivering, polymer-bonded lead and a polymer-bonded wood substitute material, the wood substitute material at least partly covering or surrounding the lead along its length, there being disposed between the lead and the wood substitute material at least one adhesion promoter layer. The invention further relates to a method of producing a writing, drawing, decorating or cosmetic pencil of this type.

Pencils of the type mentioned above are known in principle. In this case, the wood substitute material replaces the naturally grown wood typically used to hold the colour-delivering lead.

Wood-mounted pencils in which the lead is surrounded or encased in natural wood have been known for some time. In recent years, the price of high-grade woods has risen due to their short supply and this has had a direct impact on the production cost of the pencils. In addition, comparatively large natural wood reserves are used in the production of pencils.

For this reason, people have strived for years to replace natural wood with wood substitute materials, which are more cost-effective and conserve natural wood stocks.

Hence, DE 42 30 792 C2 has already disclosed co-extruded pencils with a polymer-bonded lead and a shaft made from a wood substitute material in the form of an expanded polymer to encase the lead rather than wood. The disadvantage of such pencils, however, is that this sort of wood substitute material has a low modulus of elasticity and therefore a high elasticity, which the lead itself does not normally possess. The result is that the lead may break or be damaged in the pencil. In order to circumvent this problem, the lead is usually adjusted to the same elasticity, which in turn results in a significant deterioration in its writing properties.

It is furthermore to be seen as detrimental that a pencil with a wood substitute material made from an expanded polymer has a sharpening performance unlike that of naturally grown wood for the user. The customary sharpening noise and brittleness inherent in naturally grown wood are missing.

Furthermore, co-extruded pencils with polymer-bonded leads and polymer-bonded wood substitute material are known, wherein the wood substitute material has inorganic fillers. It must be seen as a disadvantage that the sharpenability of these pencils has to be classed as inadequate, on account of the inorganic fillers.

SUMMARY OF THE INVENTION

The object of the invention is therefore to create a writing, drawing, decorating or cosmetic pencil with a sharpening performance resembling that of a wood-mounted pencil and, in addition, with a lead having excellent writing properties and also to provide a method of producing such a pencil.

The object for the writing, drawing, decorating or cosmetic pencil, comprising a colour-delivering, polymer-bonded lead and a polymer-bonded wood substitute material, the wood substitute material at least partly covering or surrounding the lead along its length, there being disposed between the lead and the wood substitute material at least one adhesion promoter layer, is achieved in that the lead and the wood substitute material each comprises at least one polymer, the at least one polymer in the lead being incompatible with the at least one further polymer in the wood substitute material, and in that the at least one adhesion promoter layer is connected, on the one hand, to the at least one polymer in the lead and, on the other hand, to the at least one further polymer in the wood substitute material.

It has emerged that in order for the intended object to be achieved, the lead and the wood substitute material must be formed on the basis of different polymer bonds, so that, on the one hand, the necessary writing properties of the lead and, on the other, the necessary rigidity and sharpenability of the wood substitute material can be achieved. It has further emerged that this requires the lead and the wood substitute material to contain polymers that are incompatible with one another. This means that the lead material and the wood substitute material make no connection with one another or only an insufficiently firm connection. As a result, the lead is not sufficiently supported during use and frequently break during writing. For this reason, efforts are made to dispose at least one adhesion promoter layer between the lead and the wood substitute material. Surprisingly, it has emerged that at least one adhesion promoter layer, which, on the one hand, is connected to the at least one polymer in the lead and, on the other hand, to the at least one further polymer in the wood substitute material, creates a firm, permanent connection between the lead and the wood substitute material. A pencil produced in this way has the necessary properties in relation to the sharpenability and writing properties of the lead and could be mistaken for a wood-mounted pencil.

In order to assess the sharpenability of pencils according to the invention, these were sharpened. In this case, a pencil with a so-called sharpening moment of less than 10 Ncm during testing or sharpening is regarded as sharpenable with little effort. The sharpening moment is determined in a piece of test equipment intended for this purpose, by continuously sharpening a test specimen in the form of a pencil for 20 secs. The average torque [in Ncm] determined during sharpening, which is necessary for the continuous sharpening of a pencil with a diameter of 7.6±0.2 mm at a speed of 43 rpm which already has a pointed end, i.e. is already sharpened to the desired angle, in a customary sharpener with a new blade, is referred to as the sharpening moment.

DETAILED DESCRIPTION OF THE INVENTION

Figure 1:
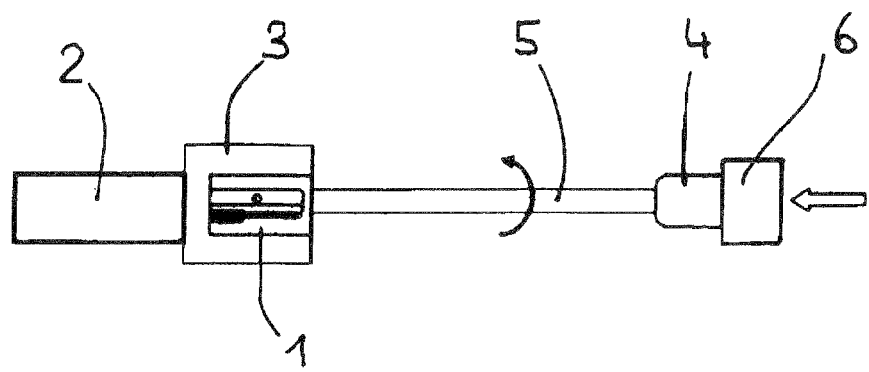
FIG. 1 schematically illustrates a device for measuring the sharpening moment.

The principle of a device for measuring the sharpening moment is illustrated for clarification in FIG. 1. This involves a pencil sharpener 1 being secured in a clamp 3 connected to a torque measuring device 2. A pencil 5 is rotatably supplied in an adapter 4 and introduced into the sharpener 1. The rotating pencil 5 is fed forward pneumatically in the direction of the sharpener 1 by means of a feed mechanism 6, which acts on the adapter 4 holding the pencil 5 with a feed force of 20 N (see arrow to the right of the picture). The torque measured during the sharpening procedure of the pencil 5 by the torque measuring device 2 is recorded and averaged out over the test duration, in order to determine the sharpening moment.

The desired flexural strength of the wood substitute material for use as a casing for lead in pencils is particularly around at least 50 MPa. The modulus of elasticity is preferably around at least 5000 MPa. The flexural strength and modulus of elasticity are determined using the 3-point flexural test according to DIN 52186 (Wood Testing—Flexural Test).

Figure 2:
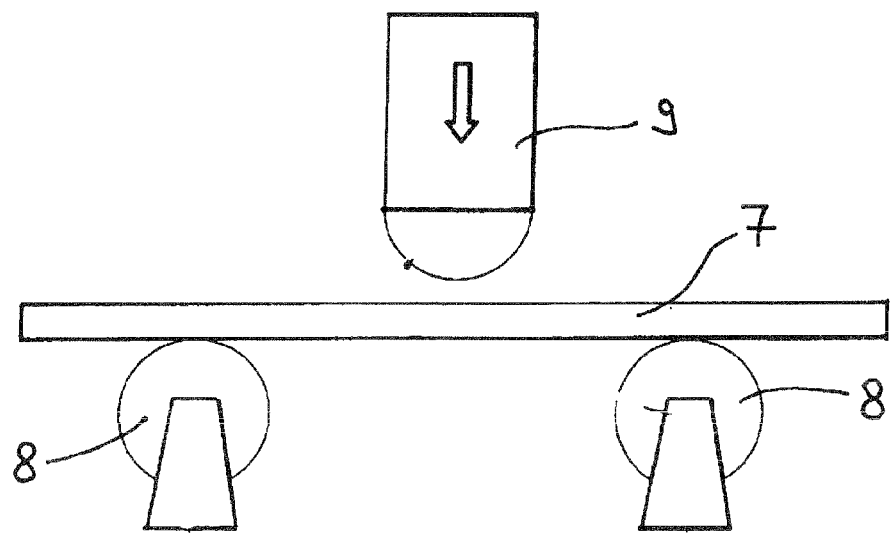
FIG. 2 schematically illustrates a bending measurement test.

FIG. 2 shows a measuring device for carrying out this sort of 3-point flexural test. Cylindrical test specimens 7 in the form of pencils with a diameter of 7.6±0.2 mm and a length of 180±5 mm are used. The test specimen 7 is mounted on moving rollers 8 with a width between supports of 100 mm (gap between the mid-points of the rollers 8). Force is applied to the centre using a test stamp 9. The rollers 8 and test stamp 9 have a 15 mm radius. The test specimen 7 is evenly loaded during testing, until the test specimen 7 breaks. The flexural strength and modulus of elasticity of the test specimen 7 are determined from the necessary breaking force and the measured deflection of the test specimen 7 under the increasing load.

Examples of writing, drawing or decorating pencils are particularly lead or coloured pencils. Examples of cosmetic pencils are particularly kohl pencils or lip liners.

Advantageous embodiments of the pencil according to the invention are listed below.

It has proved particularly beneficial for the at least one polymer in the lead to be made from polystyrene or SAN.

It has further proved beneficial if the at least one other polymer in the wood substitute material is chosen from the group of polyolefins.

Polyolefins in the wood substitute material are incompatible with polystyrene or SAN in the lead.

The at least one adhesion promoter layer is preferably formed from a copolymer, a block polymer, a graft polymer or a polymer blend.

It is particularly preferable for the at least one adhesion promoter layer to be formed from a styrene-butadiene copolymer and/or a styrene/ethene-butene/styrene block copolymer, in order to connect a polyolefin in the wood substitute material to polystyrene or SAN in the lead.

The mode of operation of the adhesion promoter is explained in greater detail with the help of the following figures.

Figure 3:
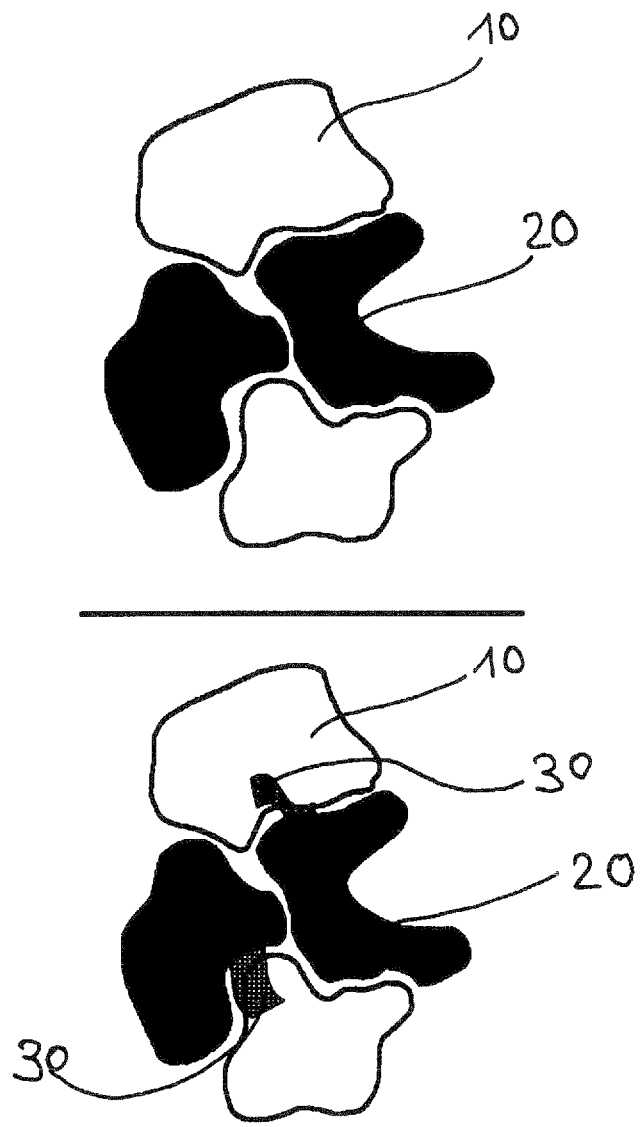
FIG. 3 schematically illustrates incompatible polymers.

FIG. 3 above shows incompatible polymers 10 and 20, which exist together at their boundary surfaces without any connection. By contrast, FIG. 3 below shows a bridging between the domains of the inherently incompatible polymers 10 and 20 in the presence of an adhesion promoter 30. The adhesion promoter makes the polymers compatible/compliant or at least partially compatible.

Figure 4:
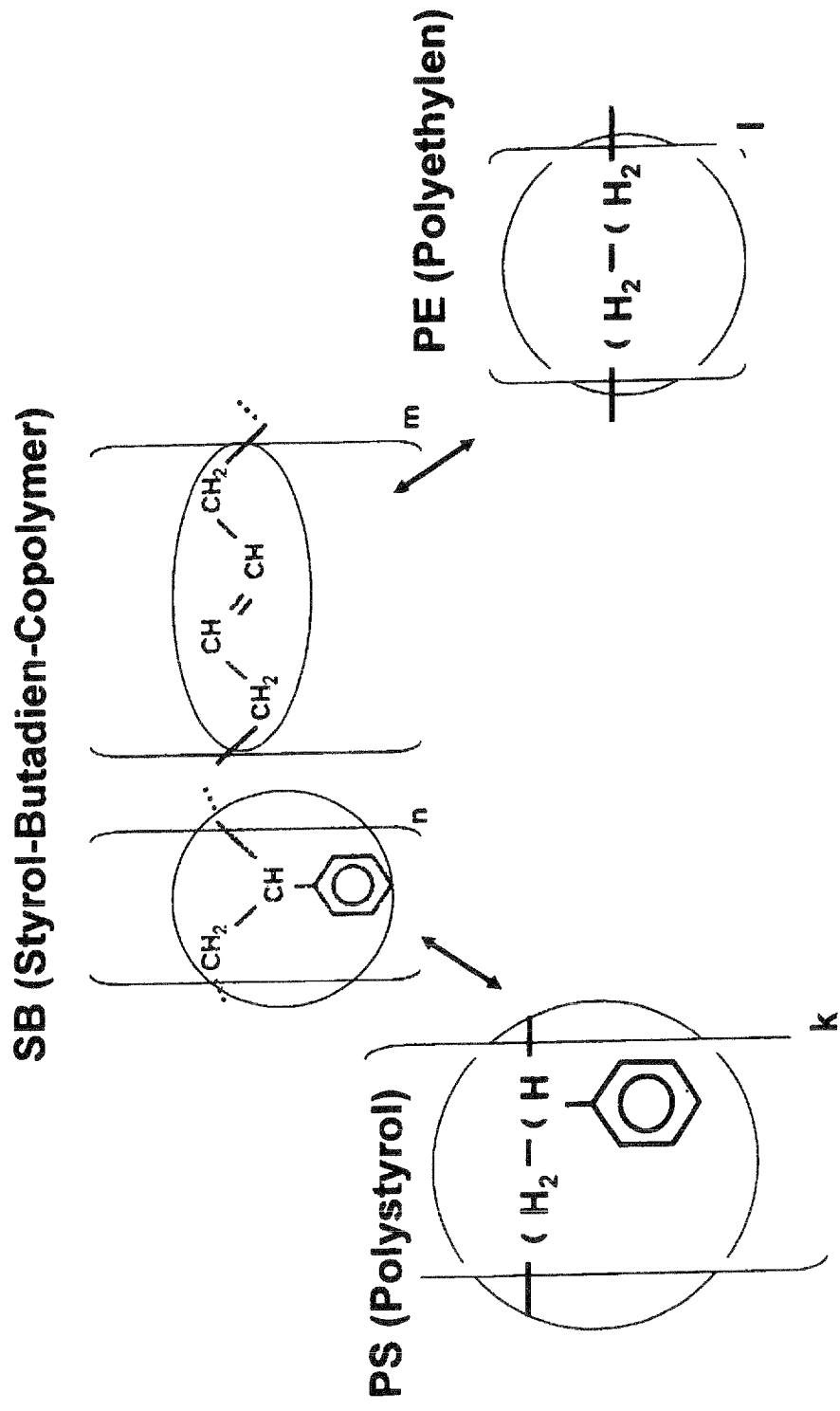
FIG. 4 illustrates incompatible polymers.

FIG. 4 shows by way of example two polymers that are incompatible with one another. These are polystyrene and polyethylene. These polymers do not form any connection or bridges with one another. It is only in the presence of an adhesion promoter in the form of a styrene-butadiene copolymer that a connection is made between the two.

Two exemplary embodiments of coextruded pencils are illustrated below, in which an adhesion promoter layer is inserted between the lead and the wood substitute material, in order to connect inherently non-compliant or incompatible polymer groups to one another. In addition, these pencils may be provided with a decorative layer.

Exemplary Embodiment 1, Pencil with Polymer Layer Composition

| | |
|---|---|
| Lead | Polystyrene (PS) |
| Adhesion promoter/lead casing | Styrene-butadiene copolymer (SB) |
| Wood substitute (WPC) | Polyolefin (PE-HD) |
| Decoration | TPE |

Exemplary Embodiment 2, Pencil with Polymer Layer Composition

| | |
|---|---|
| Lead | (SAN) |
| Adhesion promoter/lead casing | Styrene-butadiene copolymer (SB) |
| Wood substitute (WPC) | Polyolefin (PE) |
| Decoration | Polypropylene (PP) |

It has proved particularly successful for the at least one polymer-bonded wood substitute material to be made up of

| | |
|---|---|
| 15-30% by wt. | of at least one polyolefin, |
| 50-80% by wt. | of at least one organic filler, |
| 0-20% by wt. | of at least one inorganic filler, |
| 0.5-5% by wt. | of at least one adhesion promoter, |
| 1-30% by wt. | of at least one wax, |
| 0-10% by wt. | of at least one dye pigment and |
| 0-10% by wt. | of at least one additive. |

For sharpenability, it is advantageous for the at least one wax in the wood substitute material to be chosen from the group of waxes comprising amide waxes, fatty acids, such as stearic acid and palmitic acid, montan waxes, stearates, fatty acid esters, paraffin waxes.

For sharpenability, it is particularly advantageous for the at least one wax in the wood substitute material to be formed from amide wax and/or stearic acid.

For sharpenability, it proved most beneficial for the at least one wax in the wood substitute material to be formed from a combination of amide wax and stearic acid, wherein the ratio of amide wax to stearic acid ranges from 1:0.5 to 1:2.

So that the wood substitute material takes on a wood-like character, it is advantageous for the at least one organic filler to be made from wood and/or cellulose. For sharpenability, it is particularly advantageous for the at least one organic filler to be formed from filler particles with a maximum particle size of 250 μm, particularly of maximum 100 μm.

An adhesion promoter is needed to connect wood with a polar surface and polyolefins with a non-polar surface. Since adhesion promoters for polyethylene (PE) and polypropylene (PP) are available on the market, it is advantageous for the polyolefin to be formed from polyethylene (PE) and/or polypropylene (PP).

An adhesion promoter formed by a polyethylene (PE) with maleic acid anhydride grafted on has proved successful in connecting wood and PE.

To achieve a flexural strength of over 50 MPa and a modulus of elasticity of over 5000 MPa, it is particularly advantageous if the at least one polyolefin is formed from polyethylene high-density (PE-HD).

In order to lighten the colour shade of the wood substitute material, it has proved successful for the wood substitute material to contain 1 to 3% by wt white dye pigment.

To lighten the colour shade, it proved advantageous for the white dye pigment to be formed from titanium dioxide ($TiO_2$).

To set the desired colour tone, it is advantageous for the wood substitute material to contain 0.1 to 5% by wt. coloured dye pigment.

To set the brittleness and sliding properties during sharpening, it is advantageous for the at least one inorganic filler in the wood substitute material to be chosen from the group of fillers made up of layer silicates, calcium sulphate, calcium carbonate, boron nitride, soapstone, graphite.

In order to achieve special properties and satisfy particular requirements, it is advantageous for the at least one additive in the wood substitute material to be chosen from the group of additives comprising anti-friction agents, softening agents, surface-active substances, thermal stabilisers, UV stabilisers.

Given below are two sample formulations for the wood substitute material that have proved successful for extrusion:

Sample Wood Substitute Material Formulation 1

| | |
|---|---|
| Polyethylene high-density (PE-HD) | 25.0% by wt |
| Wood dust | 65.0% by wt |
| Polyethylene with grafted maleic acid anhydride | 2.0% by wt |
| Amide wax | 3.0% by wt |
| Stearic acid | 3.0% by wt |
| Titanium dioxide | 2.0% by wt |

Sample Wood Substitute Material Formulation 2

| | |
|---|---|
| Polypropylene(PP) | 20.0% by wt |
| Wood dust | 70.0% by wt |
| Polypropylene with grafted maleic acid anhydride | 1.0% by wt |
| Amide wax | 3.0% by wt |
| Stearic acid | 1.0% by wt |
| Boron nitride | 5.0% by wt |

A polymer-bound lead made from

| | |
|---|---|
| 10 to 30% by wt | polystyrene or styrene acrylo-nitrile (SAN) |
| 2 to 25% by wt | wax |
| 0.1 to 5% by wt | palm oil |
| remainder | filler(s) | combined with the wood substitute material described above has proved successful.

This lead composition has outstanding extrusion properties. Surprisingly, it has emerged that through the targeted use of palm oil as a lead component, an internal anti-friction agent is added to the formulation, which causes the extrusion pressure in an extruder to be reduced significantly. The palm oil additive in the lead composition produces in particular a significant reduction in the compression or extrusion pressure at the extruder mouth or head during extrusion.

During this process, the pressure drops as the quantity of palm oil added increases, with a reduction in pressure by at least 30%, particularly by at least 50%, being achieved compared with traditional extrudable lead compositions.

It has been established that although other natural or synthetic oils also reduce the pressure in an extruder, they have a disproportionately high detrimental effect on the strength of the extruded lead. Surprisingly, this is not the case when using palm oil, as the pressure in the extruder is low and the required level of strength in the lead therefore exists.

The typical fatty acid distribution of palm oil is composed as follows (in % by wt):

| | |
|---|---|
| C12: lauric acid | 0-1% |
| C14: myristic acid | 0-3% |
| C16: palmitic acid | 36-47% |
| C18: stearic acid | 2-8% |
| C18: oleic acid | 36-42% |
| C18: linoleic acid | 7-12% |
| C18: linolenic acid | 0-1% |
| Other: | max. 1% |

In addition, the palm oil produces a stronger impression of colour in the lead coating and improves its sliding properties during writing. In the case of pencil leads, a rich downstroke with a high optical density emerges, while coloured pencil leads produce a rich, luminously strong shade of colour in the downstroke.

The proportion of palm oil in the lead composition ranges from 0.1 to 5% by wt, particularly from 0.5 to 2.5% by wt.

If the palm oil content exceeds the preceding limit of 5% by wt, the strength of the lead is reduced by a disproportionately high degree, even when using palm oil. The leads then tend to crumble or break during use.

The waxes used in the lead are kneadable at 20 PC, solid to brittle-hard, display a coarse to fine-crystalline structure, are translucent to opaque in colour, but not vitreous, and melt at over 40° C. without decomposing. They are readily liquid at a little above the melting point and have a heavily temperature-dependent consistency and solubility.

The polymer-bonded leads are unbaked leads that can be used without further heat treatment or impregnation.

It is particularly preferable for the polymer-bonded lead to contain

| | |
|---|---|
| 15 to 25% by wt | polystyrene or SAN |
| 4 to 20% by wt | wax |
| 0.5 to 2.5% by wt | palm oil and |
| remainder | filler(s). |

It has further proved successful for the at least one wax in the lead to be at least one from the group made up of stearates, montan waxes, amide waxes, paraffins. Mixtures of two or more waxes can also be used in the wax.

In this case, it is particularly preferable for the at least one wax in the lead to be formed from calcium stearate or to include calcium stearate.

Advantageously, the at least one filler in the lead is formed from at least one filler from the group comprising graphite, soot, hexagonal boron nitride, layer silicates, chalk, barium sulphate, coloured pigments, achromatic pigments.

For pencil leads, particular preference is given to graphite or graphite combined with soot as the colour-delivering fillers. For coloured pencil leads, combinations of white or colourless fillers, such as hexagonal boron nitride, layer silicates, etc. with colour-delivering pigments, such as azo pigments, phthalocyanine, dioxazine, chinacridone, iron oxides, soot, graphite, ultramarine, iron-cyan complexes have proved successful.

A preferred composition for a pencil lead is made up of:

| | |
|---|---|
| 15 to 25% by wt | polystyrene or styrene acrylo-nitrile |
| 4 to 12% by wt | wax |
| 0.5 to 2% by wt | palm oil and |
| remainder | graphite or graphite and soot |

A pencil lead particularly displays:

| | |
|---|---|
| 15 to 25% by wt | polystyrene (PS) or styrene acrylonitrile |
| 4 to 12% by wt | calcium stearate |
| 0.5 to 2% by wt | palm oil and |
| remainder | graphite or graphite and soot |

A formulation 1 for a pencil lead indicated by way of example comprises:

| | |
|---|---|
| Polystyrene (PS) | 21% by wt |
| Calcium stearate | 6% by wt |
| Palm oil | 1.0% by wt |
| Graphite | remainder |

An exemplary formulation 2 for a pencil lead comprises:

| | |
|---|---|
| Styrene acrylonitrile (SAN) | 15% by wt |
| Aluminium stearate | 10% by wt |
| Palm oil | 2% by wt |
| Graphite | remainder |

A preferred composition for a coloured pencil lead comprises:

| | |
|---|---|
| 15 to 25% by wt | polystyrene or SAN |
| 4 to 12% by wt | wax |
| 0.5 to 2% by wt | palm oil and |
| remainder | layer silicate(s) and/or hexagonal boron nitride and at least one coloured pigment and/or an achromatic pigment |

A coloured pencil particularly displays:

| | |
|---|---|
| 15 to 25% by wt | polystyrene (PS) |
| 4 to 12% by wt | montan waxes |
| 0.5 to 2% by wt | palm oil and |
| remainder | talcum and/or hexagonal boron nitride and at least one coloured pigment and/or an achromatic pigment |

For the writing, drawing, decorating or cosmetic pencil according to the invention, it has proved successful for there to be at least one decorative layer on the side of the wood substitute material facing away from the lead. This replaces the traditional coat of paint and is particularly coloured and/or provided with a manufacturer-typical stamp.

In this case, it has proved successful for the at least one decorative layer to be a polymer-bonded decorative layer, which is compatible with the at least one further polymer in the wood substitute material.

Alternatively, it is possible for the at least one decorative layer to be a polymer-bonded decorative layer, which is incompatible with the at least one further polymer in the wood substitute material and for there to be at least one further adhesion promoter layer between the wood substitute material and the at least one decorative layer, wherein the at least one further adhesion promoter layer, on the one hand, is connected to the at least one further polymer in the wood substitute material and, on the other, to the polymer in the at least one decorative layer.

The object is achieved for the method of producing a writing, drawing, decorating or cosmetic pencil, in that the lead, the at least one adhesion promoter layer and the wood substitute material are coextruded.

The object is achieved for the method of producing a writing, drawing, decorating or cosmetic pencil, in that the lead, the at least one adhesion promoter layer, the wood substitute material, optionally the at least one further adhesion promoter layer and the at least one decorative layer are coextruded.

While the pencil is coextruded, the different components (lead, adhesion promoter, wood substitute material and decoration) are each fused in an extruder and the viscous melt is conveyed to a joint mould. In this mould, the individual components are geometrically preformed, combined together and jointly ejected. After leaving the mould, the continuous strand extruded in this way is cooled and solidifies in the present geometry. The continuous strand is separated following cooling, the pieces are conveyed to follow-on units for decoration (foil stamping) and finishing (sharpening).

Based on the production process and the outstanding adhesion created between the lead and the wood substitute material, it is possible for the wood substitute material to be formed in a wide variety of designs. Hence, the wood substitute material may surround the lead as a closed ring, viewed in cross-section, may be formed as circular segments or extend in a spiral along the lead.

The invention claimed is:

1. A writing, drawing, decorating or cosmetic pencil comprising: a color-delivering, polymer-bonded lead; a polymer-bonded wood substitute material, the wood substitute material including at least one organic filler and at least partly covering or surrounding the lead along its length; and at least one adhesion promoter layer disposed between the lead and the wood substitute material, wherein the lead and the wood substitute material each have at least one polymer, the at least one polymer in the lead being incompatible with the at least one further polymer in the wood substitute material so that the at least one polymer of the lead and the at least one further polymer of the wood substitute material do not create any connection with one another, and the at least one adhesion promoter layer is connected to the at least one polymer in the lead and to the at least one further polymer in the wood substitute material so that the at least one adhesion promoter layer forms a connection with the at least one polymer in the lead and with the at least one further polymer of the substitute material, and wherein the at least one organic filler is formed by filler particles having a maximum particle size of 250 μm.

2. The writing, drawing, decorating or cosmetic pencil according to claim 1, wherein the at least one polymer in the lead is made from polystyrene or SAN.

3. The writing, drawing, decorating or cosmetic pencil according to claim 1, wherein the at least one further polymer in the wood substitute material is chosen from the group of polyolefins.

4. The writing, drawing, decorating or cosmetic pencil according to claim 1, wherein the at least one adhesion promoter layer is formed from a copolymer, a block polymer, a graft polymer or a polymer blend.

5. The writing, drawing, decorating or cosmetic pencil according to claim 1, wherein the at least one adhesion promoter layer is formed from a styrene-butadiene copolymer and/or a styrene/ethene-butene/styrene block copolymer.

6. The writing, drawing, decorating or cosmetic pencil according to claim 1, wherein the at least one polymerbonded wood substitute material is made up of

| | |
|---|---|
| 15-30% by wt. | of at least one polyolefin, |
| 50-80% by wt. | of at least one organic filler, |
| 0-20% by wt. | of at least one inorganic filler, |
| 0.5-5% by wt. | of at least one adhesion promoter, |
| 1-30% by wt. | of at least one wax, |
| 0-10% by wt. | of at least one dye pigment, and |
| 0-10% by wt. | of at least one additive. |

7. The writing, drawing, decorating or cosmetic pencil according to claim 1, wherein the polymer-bonded lead is made from

| | |
|---|---|
| 10 to 30% by wt | polystyrene or styrene acrylo-nitrile (SAN) |
| 2 to 25% by wt | wax |
| 0.1 to 5% by wt | palm oil |
| remainder | filler(s). |

8. The writing, drawing, decorating or cosmetic pencil according to claim 1, and further comprising at least one decorative layer disposed on a side of the wood substitute material facing away from the lead.

9. The writing, drawing, decorating or cosmetic pencil according to claim 8, wherein the at least one decorative layer is a polymer-bonded decorative layer, which is compatible with the at least one further polymer in the wood substitute material.

10. The writing, drawing, decorating or cosmetic pencil according to claim 8, wherein the at least one decorative layer is a polymer-bonded decorative layer, which is incompatible with the at least one further polymer in the wood substitute material, and further comprising at least one further adhesion promoter layer disposed between the wood substitute material and the at least one decorative layer, wherein the at least one further adhesion promoter layer is connected to the at least one further polymer in the wood substitute material and to the polymer in the at least one decorative layer.

11. A method of producing a writing, drawing, decorating or cosmetic pencil according to claim 8, including the step of co-extruding the lead, the at least one adhesion promoter layer, the wood substitute material, and selectively the at least one further adhesion promoter layer and the at least one decorative layer.

12. A method of producing a writing, drawing, decorating or cosmetic pencil according to claim 1, including the step of co-extruding the lead, the at least one adhesion promoter layer and the wood substitute material.

* * * * *